(12) United States Patent
Gianone et al.

(10) Patent No.: US 10,465,783 B2
(45) Date of Patent: Nov. 5, 2019

(54) DIFFERENTIAL GEAR ASSEMBLY AND COMPONENTS THEREOF

(71) Applicant: Meritor Heavy Vehicle Systems Cameri SpA, Cameri (Novara) (IT)

(72) Inventors: Roberto Gianone, Barengo (IT); Marco Fratelli, Vigevano (IT)

(73) Assignee: Meritor Heavy Vehicle Systems Cameri SpA, Cameri (Novara) (IT)

( * ) Notice: Subject to any disclaimer, the term of this patent is extended or adjusted under 35 U.S.C. 154(b) by 121 days.

(21) Appl. No.: 15/708,465

(22) Filed: Sep. 19, 2017

(65) Prior Publication Data

US 2018/0080537 A1   Mar. 22, 2018

(30) Foreign Application Priority Data

Sep. 21, 2016 (EP) ..................... 16189830

(51) Int. Cl.
| | |
|---|---|
| *F16H 48/08* | (2006.01) |
| *F16H 48/38* | (2012.01) |
| *F16H 48/40* | (2012.01) |

(52) U.S. Cl.
CPC ............. *F16H 48/08* (2013.01); *F16H 48/38* (2013.01); *F16H 48/40* (2013.01); *F16H 2048/085* (2013.01); *F16H 2048/382* (2013.01)

(58) Field of Classification Search
CPC .......... F16H 48/08; F16H 48/40; F16H 48/38; F16H 2048/085
See application file for complete search history.

(56) References Cited

U.S. PATENT DOCUMENTS

| | | | |
|---|---|---|---|
| 3,915,267 A | 10/1975 | Shea | |
| 3,966,020 A * | 6/1976 | Quick | F16H 48/08 184/11.1 |
| 4,183,263 A | 1/1980 | Osenbaugh | |
| 4,467,672 A * | 8/1984 | Lamy | B60K 17/16 475/230 |
| 5,273,498 A | 11/1993 | Dhillon et al. | |
| 6,045,479 A | 4/2000 | Victoria et al. | |
| 6,053,835 A | 4/2000 | Shibazaki et al. | |
| 6,802,793 B2 | 10/2004 | Zink et al. | |
| 7,291,083 B2 | 11/2007 | Almaguer | |
| 7,367,914 B2 | 5/2008 | Rosochacki et al. | |
| 7,695,392 B2 | 4/2010 | Isken, II et al. | |
| 7,819,040 B2 | 10/2010 | Meier et al. | |
| 8,535,191 B1 | 9/2013 | Gall et al. | |

(Continued)

FOREIGN PATENT DOCUMENTS

| | | |
|---|---|---|
| DE | 102012014950 A1 | 1/2013 |
| DE | 102012214165 A1 | 2/2014 |

(Continued)

OTHER PUBLICATIONS

European Patent Office, Extended European Search Report for the corresponding European Patent Applicatio No. 16189830.9 dated Mar. 27, 2017.

*Primary Examiner* — Justin Holmes
(74) *Attorney, Agent, or Firm* — Brooks Kushman P.C.

(57) ABSTRACT

A differential gear assembly, a gear shaft for a differential gear assembly, and a method of assembly. The differential gear assembly includes a casing, a first gear shaft, a first differential side gear, and at least one fastening member. The fastening member may be visible from outside the casing.

19 Claims, 2 Drawing Sheets

(56) References Cited

U.S. PATENT DOCUMENTS

| | | |
|---|---|---|
| 8,651,994 B2 | 2/2014 | Bassi et al. |
| 9,109,635 B2 | 8/2015 | Boothby et al. |
| 9,410,605 B2 | 8/2016 | Kluck |
| 9,719,563 B2 | 8/2017 | Hirao |
| 2009/0013533 A1 | 1/2009 | Isken, II et al. |
| 2009/0215572 A1* | 8/2009 | Yeh ........................ F16H 48/08 475/230 |
| 2012/0149522 A1 | 6/2012 | Isken, II et al. |
| 2015/0059180 A1 | 3/2015 | Hirao |
| 2015/0107933 A1 | 4/2015 | Gopal et al. |
| 2016/0208899 A1* | 7/2016 | Fisher ..................... F16H 48/38 |
| 2016/0356372 A1* | 12/2016 | Zalewski ................ F16H 48/40 |

FOREIGN PATENT DOCUMENTS

| | | | | |
|---|---|---|---|---|
| DK | 106479 C | | 2/1967 | |
| GB | 2179714 | * | 3/1987 | .............. F16H 1/40 |
| GB | 2179714 A | | 3/1987 | |
| WO | 2007085845 A1 | | 8/2007 | |
| WO | 2010016896 A1 | | 2/2010 | |

\* cited by examiner

DIFFERENTIAL GEAR ASSEMBLY AND COMPONENTS THEREOF

TECHNICAL FIELD

This invention relates to a differential gear assembly of a motor vehicle, and particularly to a differential gear casing and components thereof. The present invention also relates to a method of assembling a differential gear assembly.

BACKGROUND

Differential gear assemblies are provided in driven axles of vehicles to permit left and right driven wheels to rotate at different speeds whilst transmitting torque; as is well known, such an arrangement is required to permit a vehicle to turn from a straight line.

Many kinds of different gear assemblies have been proposed, but the most common consist of a casing in which at least one rotatable differential side gear is arranged in mesh with opposite end gears of the vehicle drive shafts. The casing carries an annular crown wheel which is driven by a pinion of an input shaft, which itself is driven by the vehicle engine.

The aforementioned side gears are rotatably mounted on a gear shafts, which are, in turn, received within openings of the casing. In order to prevent the gear shafts from moving radially outwardly out of the casing, as a result of separating forces between the differential side gears and the end gears of the half shafts, it is commonly known to fix the gear shaft in place with respect to the casing, by fastening screws. Depending on the construction of the differential gear assembly, it is often required to fix the gear shaft in place before the crown wheel is attached to the casing, as the crown wheel may prevent any access to the gear shafts thereafter. At this point, the gear shafts must be reliably connected to the casing as a correction of the connection between the casing and the gear shafts may no longer be possible. This is particularly problematic if the crown wheel permanently attached to the casing, e.g., by welding.

In view of the above, it is an objective of the present invention to provide a gear assembly and a method of assembling the latter to provide a stable connection between the gear shaft and the casing can be achieved reliably before the crown wheel is attached.

SUMMARY

In a first embodiment, the invention relates to a differential gear assembly comprising a casing extending along a longitudinal drive axis and adapted to receive end gears of first and second half shafts of a vehicle drive axle, the casing comprising at least one opening extending perpendicular to the drive axis between outer and inner surfaces of the casing. The casing comprises a cavity, extending substantially parallel to the longitudinal drive axis and adapted to receive the at least one fastening member. A first gear shaft is received within the at least one opening of the casing and a first differential side gear adapted to mesh with end gears of said first and second half shafts is rotatably mounted on the first gear shaft. The gear shaft comprises at least one flat extending from its first end surface towards the second end surface. The first flat is constructed to form a first shoulder portion that defines a first bearing surface, which is recessed from the first end surface. The gear assembly further comprises at least one fastening member adapted to fix the first gear shaft with respect to the casing, wherein the at least one fastening member contacts the first bearing surface. The first bearing surface is received within the at least one opening in such a way that the at least one fastening member is visible from the outside of the casing.

The new differential gear assembly allows the manufacturer to inspect the connection between the casing and the gear shaft by viewing the position of the fastening member before the crown wheel or other parts of the differential gear assembly are attached. This particular design simplifies quality control processes for differential gear assemblies, thus reducing the amount of defective differential gears. The flat extending from the first end surface of the gear shaft is a first alternative of constructing the differential gear assembly such that the fastening member is visible from the outer surface of the casing. As will be described in more detail below, the flat creates a gap between the outer surface of the gear shaft and the inner surface of the opening of the casing that can be used to view the fastening member in its assembled condition. It will be appreciated that the flat can be produced simply by milling off parts of the gear shaft along its first end surface. The flat is constructed to form a shoulder portion that is sufficiently large to form a stop surface that engages with an end portion of the fastening member. Of course, the gear shaft could include other shapes which enable the manufacturer to view the fastening member during assembly of the differential. In one alternative example, the gear shaft could comprise a longitudinal blind bore, which extends from the first end surface, that is, from the outer surface of the casing to the point of engagement between the gear shaft and the fastening member.

In another embodiment, the first gear shaft comprises opposite first and second end surfaces, wherein the at least one fastening member engages the first gear shaft between said first and second end surfaces. According to this embodiment, the fastening member does not engage with the gear shaft at its outer, first end surface but connects with a circumferential side surface of the gear shafts, which is usually received within the casing. As such, the fastening member is protected from environmental conditions by the casing.

In another embodiment, the first gear shaft comprises a substantially cylindrical shape.

The cavity in the casing may be a through hole extending between a first end arranged at a side surface of the casing and a second end arranged at an inner surface of the at least one opening.

According to another embodiment, the differential gear assembly may further comprise a cover attached to said side surface of the casing so as to cover the first end of the cavity. After the fastening member is introduced to the cavity of the casing, the cover can be attached to the side surface of the casing to secure the fastening member in place within the cavity. As such, the cover can also be used to pressurize the fastening member against the flat of the gear shaft, particularly if the fastening member is constructed as a slidable member, such as a pin.

In another embodiment, the fastening member is constructed as a pin, preferably as a solid pin. The pin may be sized to be inserted into the cavity in a press fitting manner. Constructing the fastening member as a pin provides improvements of the load distribution compared to using screws as fastening members. In particular, pins can comprise a larger diameter, and thus are able to withstand higher radial forces exerted by the gear shaft. Moreover, designing the fastening members as pins will reduce overall cost of the inventive differential gear assembly. It will also be appreciated that using solid pins allows the reduction of the pilot diameter of the gear shaft.

According to another embodiment, the differential gear assembly further comprises a second gear shaft received within a second opening of the casing adapted to receive a second differential side gear, wherein the second gear shaft is releasably connected to the first gear shaft. Preferably, the second gear shaft is produced in a substantially identical manner as the first gear shaft and releasably connected to the first gear shaft at its second end surface, opposite the second opening of the casing. In other words, the first and second gear shafts may be arranged along a common axis, which extends perpendicular to the longitudinal axis of the differential gear, and may be attached to each other at their respective second ends.

In another embodiment, the casing may comprise third and fourth openings extending perpendicular to the drive axis between the outer and inner surface of the casing, wherein the differential gear assembly further comprises a third gear shaft, said third gear shaft extending substantially perpendicular to the first and second gear shafts and being received within the third and fourth openings. According to this embodiment, the differential gear assembly comprises a three-piece spider shaft having first and second short gear shafts and a longer third gear shaft extending between the third and fourth openings of the casing. As such, the differential gear assembly may comprise third and fourth differential side gears adapted to mesh with the end gears of the first and second half shafts, the third and fourth side gears being rotatably mounted on the third gear shaft. The differential gear assembly of this embodiment, therefore, comprises four differential side gears attached to the first, second and third gear shafts. It should be noted that the first, second, third and fourth openings of the casing are preferably arranged in an equally spaced manner at 90 degree intervals along the circumference of the casing.

The aforementioned first, second and third gear shafts may be releasably attached to each other and their point of intersection to form the four-legged spider shaft assembly.

The present invention further relates to a method of assembling a differential gear assembly, the methods comprising steps of:

Providing a casing comprising at least one opening extending perpendicular to a drive axis of the differential gear assembly, between outer and inner surfaces of the casing, the casing comprising a cavity, extending substantially parallel to the longitudinal drive axis and adapted to receive a fastening member;

Inserting a first gear shaft together with a first differential side gear mounted thereon into the casing such that the first gear shaft is received within the at least one opening of the casing, said first gear shaft comprising at least one flat extending from its first end surface, said flat forming a first shoulder portion that defines a first bearing surface, which is recessed from the first end surface;

Fixing the first gear shaft with respect to the casing by inserting at least one fastening member into the cavity of the casing, such that the at least one fastening member contacts the first bearing surface, wherein the first bearing surface is received within the at least one opening in such a way that the at least one fastening member is visible from the outer surface of the casing;

Inspecting the position of the at least one fastening member from the outside of the casing; and Attaching a crown wheel to the outer surface of the casing.

As mentioned previously, the method of the present invention will reduce the number of defective differentials and simplify quality control. This is particularly the case if the crown wheel is attached to the outer surface of the casing by welding. Frequently, there is no more possibility of refastening the gear shafts after the wheel has been attached to the casing. The same applies to the connection between the casing and the aforementioned cover, which is commonly also established via a weld seam. As such, if the fastening member is not correctly aligned within the cavity, before the crown wheel or the cover are attached to the casing, the gear shafts might not be fixed in place securely and there may be no way of correcting this deficiency.

To avoid the aforementioned shortfalls, the at least one fastening member is inserted into the cavity of the casing from a first side surface of the casing and held in place by a cover, which is attached to the side surface of the casing after said fastening member is inserted and inspected.

The present invention further relates to a gear shaft for the differential gear assembly, comprising a substantially cylindrical shape extending between a first end surface and a second end surface, wherein the gear shaft comprises a two flats extending from the first end surface towards the second end surface one of the flats defining a bearing surface for receiving a fastening member and wherein the two flats define first and second shoulder portions on opposite sides of the first end surface. While the flats define bearing surfaces for the fastening member, they also facilitate inspection between the connection of the fastening member and the gear shaft, once the latter is inserted into the casing of the differential gear assembly.

According to another aspect, the shaft may also comprise two flats extending from the second end surface towards the first end surface and defining third and fourth shoulder portions for engagement with a corresponding recess of other gear shafts. The third and fourth shoulder portions may extend in a substantially perpendicular plane to the first and second flats. The third and fourth shoulder portions define an anti-rotation lock together with the remaining gear shafts, as will be described in more detail below.

The gear shaft may also comprise a knit-section arranged between the first and second end surfaces of the shaft, the mid-section comprising first and second flats for attachment to a corresponding different side gear. The flats of the mid-section can be used to secure the differential side gears in place along the longitudinal axis of the gear shafts.

BRIEF DESCRIPTION OF THE DRAWINGS

In the following detailed description, specific embodiments of the present invention will be described with regard to the figures attached. The figures show:

FIG. 2b a top view of the gear shaft shown in FIG. 2a; and

FIG. 2c a bottom view of the gear shaft shown in FIG. 2a.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
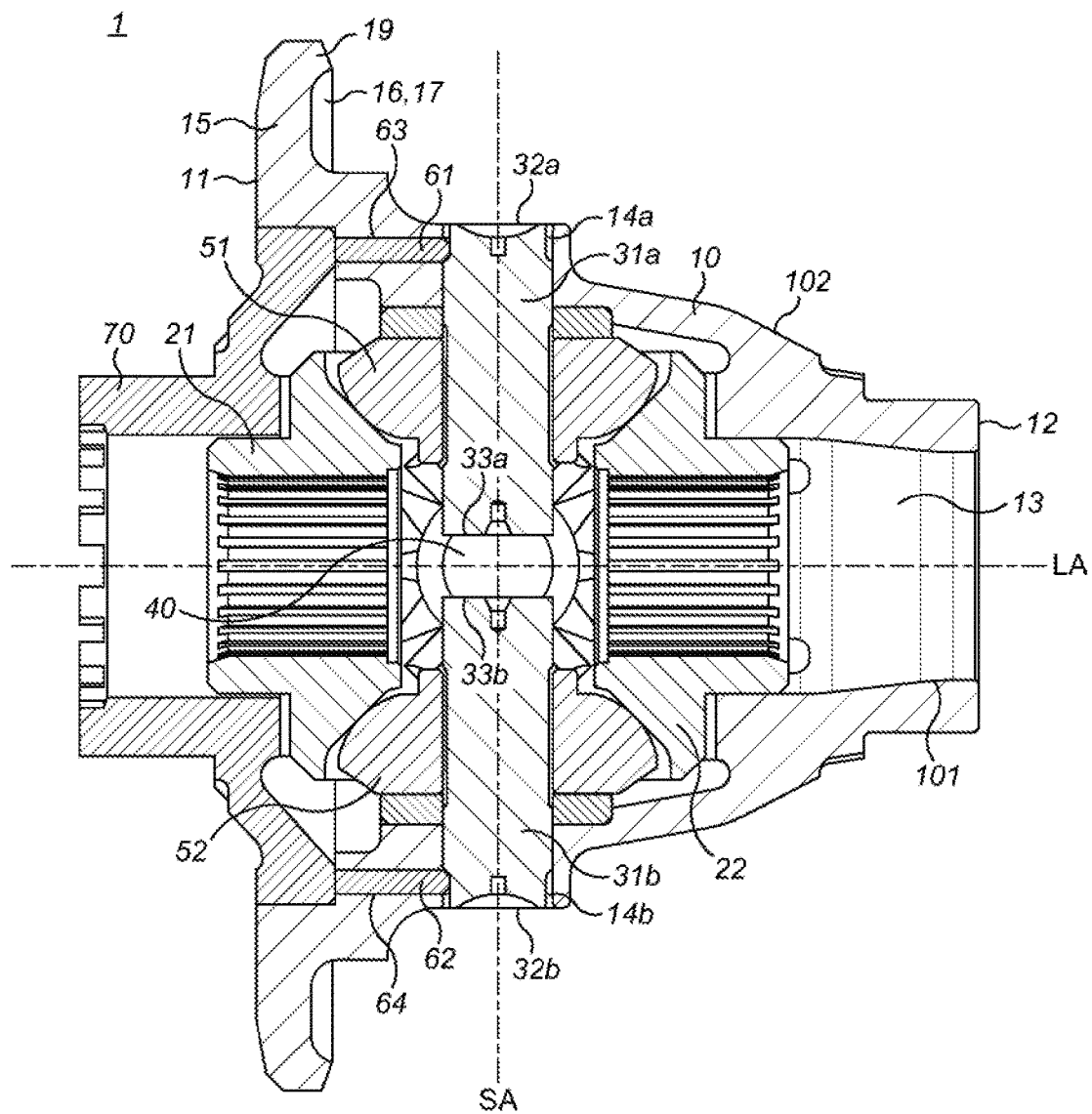
FIG. 1 a schematic cross-section of a differential gear assembly according to a first embodiment of the present invention.

FIG. 1 shows a schematic cross-section of a first embodiment of a differential gear assembly according to the present invention. The differential gear assembly 1 comprises a casing 10 with a first side end 11 and a second side end 12. The generally bowl shaped casing 10 has a cavity 13 extending between the first and second ends 11, 12, along a longitudinal axis LA. The cavity of the casing 10 is adapted to receive end gears 21, 22 of first and second half shafts of a vehicle drive axle (not shown). Along its first side end 11, the casing 10 comprises a continuous flange portion 15, which defines a circular shoulder 16 adapted to receive a close-fitting bevel gear crown wheel (not shown). As illustrated in FIG. 1, the flange portion 15 has a circular recess 17 for a corresponding circular projection of the crown wheel and a circular projection 19 for engagement in a corresponding recess of the crown wheel. On the adjacent side of the flange portion 15, that is, towards the first side end 11, the flange portion is substantially plain.

At the second side end 12, the casing defines a circular cylindrical projection concentric with the longitudinal drive axis LA. The casing has an inner surface 101 and an outer surface 102 to mount the differential gear assembly in an axle housing.

The side wall of the casing 10 has a substantially constant radius adjacent the flange portion 15. The illustration of FIG. 1 shows first opening 14a and second opening 14b. The first and second openings 14a, 14b extend perpendicular to the longitudinal drive axis LA along a common shaft axis SA between the outer and inner surfaces 101, 102 of the casing 10.

A first gear shaft 31a is received within the first opening 14a and extends along the shaft axis SA. A second gear shaft 31b is received within the second opening 14b and extends along the common shaft axis SA. The first and second gear shafts 31a, 31b both comprise opposite first and second end surfaces 32a, 32b, 33a, 33b. In the illustrated embodiment, the first end surfaces 32a, 32b of the respective first and second gear shafts 31a, 31b are arranged substantially flush with the outer surface 102 of the casing 10. The second end surfaces 33a, 33b of the gear shafts 31a, 31b are connected to each other via a third gear shaft 40, which extends in a direction perpendicular to the longitudinal drive axis LA and the shaft axis SA. The gear shafts 31a and 31b are both adapted to rotatably receive a corresponding differential side gear 51, 52. These first and second differential side gears 51, 52 are adapted to mesh with the end gears 21 and 22 of the drive axles and facilitate rotation of the drive axles at different rotational speeds.

During actuation of the differential gear assembly, radial separating forces between the end gear 21, 22 and the first and second differential side gears 51, 52 exert pressure on the differential side gears 51, 52 and their respective gear shaft 31a, 31b in a radial direction, that perpendicularly away from longitudinal drive axis LA. In order to stop the first and second gear shafts 31a, 31b from moving radially out of their respective openings 14a, 14b, fastening members 61, 62 are inserted into the casing 10 and engaged with bearing surfaces of the respective gear shaft 31a, 31b. In the particular embodiment of FIG. 1, the fastening members 61, 62 are solid bolts, which are inserted into cavities 63, 64 that extend through the casing 10 between the first side surface 11 and an inner surface of the openings 14a, 14b. The cavities 63, 64 of FIG. 1 extend in a direction parallel to the longitudinal axis of the casing 10.

Figure 2A:
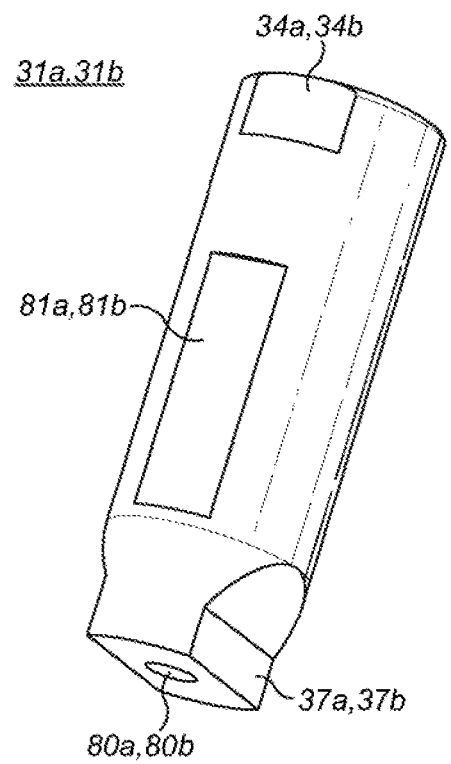
FIG. 2a a perspective side view of a gear shaft according to a first embodiment of the present invention.
Figure 2B:
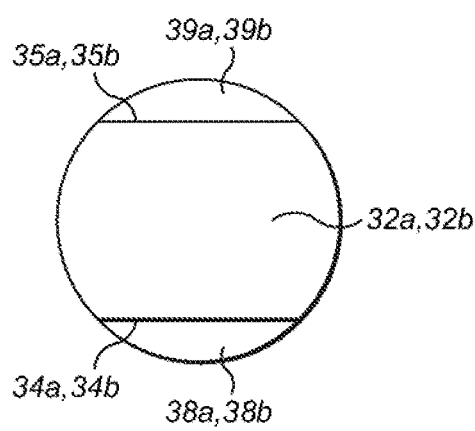
Figure 2C:
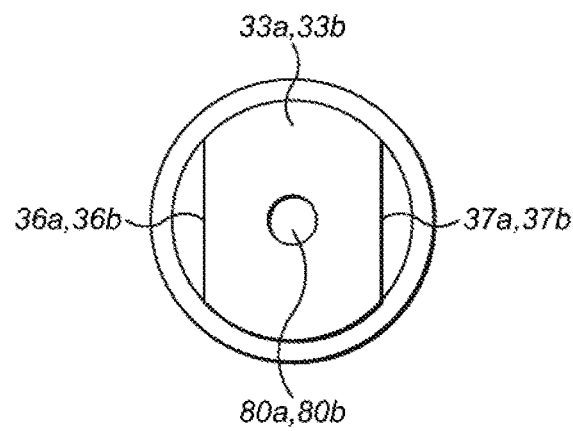

With references to FIGS. 2a to 2c, the gear shafts 31a, 31b are shown in more detail. FIGS. 2a and 2b show that the gear shafts 31a 31b, comprise first and second flats 34a, 34b, 35a, 35b which extend from the first end surface 32a, 32b towards the second end surface 33a, 33b. The flats 34a, 34b and 35a and 35b form shoulder portions along the first end of the respective gear shaft 31a, 31b, which define bearing surfaces 38a, 38b, 39, 39b. The illustration of FIG. 1 indicates that the fastening members 61, 62 engage with the gear shafts 31a, 31b at bearing surfaces 38a, 38b to provide an end stop for radial movement of the gear shafts 31a, 31b. It will be appreciated that it is generally sufficient to provide only one bearing surface 38a, 38b or 39, 39b in the embodiment shown in FIG. 1. However, providing bearing surfaces 38a, 38b, 39a, 39b on opposing ends of the first end surface 32a, 32b will simplify alignment of the gear shafts 31a, 31b with their respective fastening members 61, 62.

When looking at FIG. 1, it should be clear that the flats 34a, 34b and the so-formed recessed bearing surfaces 38a, 38b of the gear shafts 31a, 31b provide visibility of the respective fastening member 61, 62, from the outside of the casing 10 in its assembled condition. This is because the shoulder portions formed by the flats create a gap between the outer surface of the gear shaft and the inner surface of the opening. The connection between the casing 10 and the gear shafts 31a, 31b via the fastening member 61, 62 can thus be inspected during quality control, before the crown wheel (not shown) is attached, preferably welded, to the flange portion 15 of the casing 10.

After inspection of the connection between the casing and gear shafts 31a, 31 b, a cover 70 is attached to the first side end 11 of the casing 10. Cover 70, which is preferably welded to the first side end 11 of the casing 10, closes a first end of the cavities 63, 64 and thereby fixes the fastening members 61, 62 inside their respective cavities 63, 64. The cover 70 may also be used to press the first and second fastening member 61, 62 against the flat 34a, 34b of the first and second gear shafts 31a, 31 b. Preferably, the cover 70 is attached to the casing 10 after obtaining a positive inspection result of the connection between the fastening members 61, 62 and their respective gear shafts, 31a, 31b, As shown in FIG. 2c, the first and second gear shafts 31a, 31b may comprise third and fourth flats 36a, 36b, 37a, 37b defining third and fourth shoulder portions, and blind bores 80a, 80b for attaching the first and second gears shafts 31a, 31b to the third gear shaft 40 along their second end surface 33a, 33b. As can be derived from FIG. 1, the blind bores 80a, 80b can be adapted to receive pins of the third drive shaft 40 to prevent translational, relative movement between the first, second and third gear shafts 31a, 31b, 40. The flats 36a, 36b and 37a, 37b provide an anti-rotation lock of the first, second and third gear shaft 31a, 31b.

FIG. 2a further shows that the first and second gear shafts 31a, 31b comprise further flats 81a, 81b adapted to engage with the inner diameter of differential side gears 51 and 52. Similar to the first and second flats 34a, 34b, 35a, 35b, the flats 81a, 81b of the mid-section may be provided on opposite sides of the respective gear shaft 31a, 31b.

The invention is not restricted to the specific embodiments shown in FIGS. 1 to 2c. In particular, the fastening members could be hollow bolts instead of the sold bolts illustrated. The invention is also not restricted to a three-piece spider assembly as illustrated in FIG. 1, but could have a single gear shaft extending between first and second openings of the casing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential gear assembly comprising:
   a casing extending along a longitudinal drive axis and adapted to receive end gears of first and second half shafts of a vehicle drive axle, the casing including at least one opening extending perpendicular to the longitudinal drive axis between outer and inner surfaces of the casing;
   a first gear shaft received within the at least one opening of the casing, the first gear shaft including at least one flat extending from its first end surface, the flat forming a first shoulder portion that defines a first bearing surface that is recessed from the first end surface;
   a first differential side gear adapted to mesh with end gears of the first and second half shafts, the first differential side gear being rotatably mounted on the first gear shaft; and
   at least one fastening member adapted to fix the first gear shaft with respect to the casing, the at least one fastening member contacting the first bearing surface;
   wherein the casing defines a cavity that is disposed inside the casing and receives the at least one fastening member, and the first bearing surface and the at least one fastening member are received within the at least one opening such that the at least one fastening member is visible from the outside of the casing.

2. The differential gear assembly of claim 1 wherein the first gear shaft includes opposite first and second end surfaces, and wherein the at least one fastening member engages the first gear shaft between the first and second end surfaces.

3. The differential gear assembly of claim 1 wherein the first gear shaft has a substantially cylindrical shape.

4. The differential gear assembly of claim 1 wherein the cavity is a through hole and extends between a first end arranged at a side surface of the casing and a second end arranged at an inner surface of the at least one opening.

5. The differential gear assembly of claim 4 wherein the differential gear assembly further comprises a cover attached to the side surface of the casing to cover the first end of the cavity.

6. The differential gear assembly of claim 1 wherein the fastening member is a pin.

7. The differential gear assembly of claim 6 wherein the pin is a solid pin.

8. The differential gear assembly of claim 6 wherein the pin is sized to be inserted into the cavity in a press fitting manner.

9. The differential gear assembly of claim 1 wherein the differential gear assembly further comprises a second gear shaft received within a second opening of the casing adapted to receive a second differential side gear, and wherein the second gear shaft is releasably connected to the first gear shaft.

10. The differential gear assembly of claim 9 wherein the casing further comprises third and fourth openings extending perpendicular to the longitudinal drive axis between the outer and inner surfaces of the casing, and wherein the differential gear assembly further comprises a third gear shaft, wherein the third gear shaft extends substantially perpendicular to the first and second gear shafts and is received within the third and fourth openings.

11. The differential gear assembly of claim 10 wherein the differential gear assembly further comprises third and fourth differential side gears adapted to mesh with the end gears of the first and second half shafts, the third and fourth differential side gears being rotatably mounted on the third gear shaft.

12. The differential gear assembly of claim 10 wherein the first, second and third gear shafts are releasably attached to each other.

13. A method of assembling a differential gear assembly, the method comprising the steps of:
   providing a casing having at least one opening extending perpendicular to a longitudinal drive axis of the differential gear assembly between outer and inner surfaces of the casing, the casing defining a cavity that extends substantially parallel to the longitudinal drive axis and is disposed inside the casing and is configured to receive a fastening member;
   inserting a first gear shaft together with a first differential side gear mounted thereon into the casing such that the first gear shaft is received within the at least one opening of the casing, the first gear shaft having at least one flat extending from its first end surface, the flat forming a first shoulder portion that defines a first bearing surface that is recessed from the first end surface;
   fixing the first gear shaft with respect to the casing by inserting at least one fastening member into the cavity of the casing such that the at least one fastening member contacts the first bearing surface, wherein the first bearing surface and the fastening member are received within the at least one opening such that the at least one fastening member is visible from the outside of the casing;
   inspecting a position of the at least one fastening member from the outer surface of the casing; and
   attaching a crown wheel to the outer surface of the casing.

14. The method of claim 13 wherein the crown wheel is welded to the outer surface of the casing.

15. The method of claim 13 wherein the at least one fastening member is inserted into the cavity of the casing from a first side surface of the casing and held in place by a cover that is attached to the first side surface of the casing.

16. The method of claim 15 wherein the cover is welded to the first side surface of the casing after the fastening member is inserted and inspected.

17. A gear shaft for a differential gear assembly comprising:
   a first end surface;
   a second end surface;
   two flats that extend from the first end surface toward the second end surface, wherein one of the flats defines a bearing surface for receiving a fastening member and the two flats define first and second shoulder portions disposed on opposite sides of the first end surface; and
   two flats that extend from the second end surface towards the first end surface that define third and fourth shoulder portions, wherein the third and fourth shoulder portions extend in a substantially perpendicular plane with respect to the two flats that extend from the first end surface.

18. The gear shaft of claim 17 wherein the gear shaft has a substantially cylindrical shape extending between the first end surface and the second end surface.

19. The gear shaft of claim 17 wherein the gear shaft further comprises a mid-section arranged between the first end surface and the second end surface, the mid-section including first and second flats for attachment to a corresponding differential side gear.

\* \* \* \* \*